US006581325B2

(12) United States Patent
Gordon

(10) Patent No.: US 6,581,325 B2
(45) Date of Patent: Jun. 24, 2003

(54) DEVICE AND METHOD FOR CONTROLLING TERMITES

(75) Inventor: Glenn Gordon, New Port Richey, FL (US)

(73) Assignee: Gordon Laboratories, Inc., Largo, FL (US)

( * ) Notice: Subject to any disclaimer, the term of this patent is extended or adjusted under 35 U.S.C. 154(b) by 0 days.

(21) Appl. No.: 09/817,663

(22) Filed: Mar. 26, 2001

(65) Prior Publication Data

US 2002/0134004 A1 Sep. 26, 2002

(51) Int. Cl.$^7$ .................................................. A01M 1/20
(52) U.S. Cl. ......................................................... 43/132.1
(58) Field of Search ................................ 43/131, 132.1, 43/121, 141

(56) References Cited

U.S. PATENT DOCUMENTS

| | | | |
|---|---|---|---|
| 3,304,646 A | * 2/1967 | Staley | 43/131 |
| 5,152,097 A | * 10/1992 | Rhodes | 43/132.1 |
| 5,417,017 A | * 5/1995 | Toutountzis | 52/101 |
| 5,531,043 A | * 7/1996 | Shiboh | 43/131 |
| 5,609,879 A | * 3/1997 | Myles | 424/410 |
| 5,746,021 A | * 5/1998 | Green | 43/131 |
| 5,832,658 A | * 11/1998 | Randon | 43/131 |
| 5,877,422 A | * 3/1999 | Otomo | 73/587 |
| 5,899,018 A | 5/1999 | Gordon et al. | |
| 5,921,018 A | 7/1999 | Hirose et al. | |
| 5,937,571 A | * 8/1999 | Megargle et al. | 43/131 |
| 6,079,150 A | 6/2000 | Setikas et al. | |
| 6,079,151 A | 6/2000 | Bishoff et al. | |
| 6,219,961 B1 | * 4/2001 | Ballard et al. | 43/131 |
| 6,298,597 B1 | * 10/2001 | Koehler et al. | 43/131 |

OTHER PUBLICATIONS

Jerry Mix, "Homeguard Uses Its Natural Instincts," www.pestcontrolmag.com, pestcontrolmag.com, p. 32–34, (Dec. 1, 2000).
N/A, "FMC Advertisement from Pest Control Technology Magazine," Pest Control Technolgoy Magazine, GIE, Inc., vol. 27 (No. 2), p. 2, (Feb. 1, 1999).
Spectracide, "Brochure of Spectracide Terminate Termite Killing Stakes," Do–It–Yourself Termite Killing System Against Subterranean Termites, Spectracide, (Oct. 1, 2000).
G. Ettershank, J.A. Ettershank, and W.G. Whitford, "Location of Food Sources by Subterranean Termites," Environmental Entomology, Entomological Society, vol. 9, (No. 5), p. 6450648, (Oct. 15, 1980).

* cited by examiner

Primary Examiner—Charles T. Jordan
Assistant Examiner—Jordan M Lofdahl
(74) Attorney, Agent, or Firm—Dennis G. LaPointe; Mason Law, P.A.

(57) ABSTRACT

A device for the control of termites is disclosed, wherein the device is a housing which is adapted so that a moisture absorbing attractant in the housing may be heated by the housing being exposed to the natural thermal radiation of the sun when attached to the ground surface. The lower end of the housing has an opening to the interior for access by termites. Non-toxic and toxic baits may be added to the moisture absorbing attractant when activity is detected or anticipated. The device may be used together with other termite control devices mechanically connected to it. During the day, the device uses the thermal radiation of the sun to heat the attractant which absorbs moisture from the soil. At night, the attractant releases the moisture into the soil, creating a temperature anomaly readily detectable by termites.

96 Claims, 6 Drawing Sheets

DEVICE AND METHOD FOR CONTROLLING TERMITES

BACKGROUND OF THE INVENTION

1. Field of the Invention

The invention relates to relates generally to devices and methods for subterranean termite detection and control.

2. Description of Related Art

There are a variety of systems for detection and control termites known in the art, including those that incorporate housings which are implanted into the ground, and contained either an edible matrix or toxicant bait. U.S. Pat. No. 5,329,726 to Thorne et al. teaches a below ground housing for termite detection and control.

Thorne further teaches a housing which has a cartridge inserted into the housing, and the cartridge may contain either a chemical attractant to determine if termites are present or poisoned bait to kill the termites. However, to inspect the housing of Thorne to see if termites are present, one has to remove the cartridge to visually inspect it. This physically disturbs termite activity such that the termites may abandon the area and later insertion of poison could be ineffective. Further, Thorne shows a two-step method wherein the housing initially contains a non-toxic bait. If termites inhabit the housing, it is removed, and as a second step, toxic bait is inserted into the housing as a second cartridge.

U.S. Pat. No. 5,609,879 to Myles teaches a method, apparatus, and composition of treating social insects, including termites, with a poison and then releasing them. Myles discloses a trap for termites comprised of a PVC pipe and cardboard rolled within the pipe. The cardboard can also have a block of wood rolled within its center as a reserve food supply for termites. Myles also discloses an apparatus that uses heat as an attractant and then a repellent.

U.S. Pat. No. 5,921,018 to Hirose et al. teaches a device and method for luring termites which comprises an open-topped container containing wood which termites attack. Drainpipe(s) are connected to the bottom of the container, and are formed with holes through which termites can pass. Also disclosed is a method for capturing and killing termites using the termite luring device.

The ability of termites to recognize temperature anomalies is known in the art. "Location Of Food Sources By Subterranean Termites", Ettershank, Ettershank & Whitford, J. Env. Entomol. 9:645–648 (1980), surmises an ability of subterranean termite to recognize dung pat, a preferred food source, through a temperature anomaly created by the shadow cast by the dung pat. The article supports a finding that food sources above the ground are more likely to be targeted by foraging termites, rather than subterranean food sources. Further, the article does not teach what temperature anomaly attracts the termites, as it only speculates that the cooler shadow of the dung pat on the underlying soil is the anomaly detected by termites.

The temperature anomaly that attracts the termites was however researched by the inventors herein culminating in the design and method of use disclosed in U.S. Pat. No. 5,899,018 to the inventors herein and which is herein incorporated by reference.

Most termite bait stations available commercially also are relative small in size, that is around 4–9 inches in length and about 1 inch to 2¾ inch in diameter. These devices require numerous change-outs before the colony is theoretically or thought to be eliminated. After further experimentation and research by the inventors herein, the inventors herein found that even larger devices installed on top of the ground surface benefit greatly from the temperature anomaly created by exposing the upper end of the device to the sunlight. Devices ranging in size from about 4 inches in cross-section to 2–4 feet in cross-section, or even larger are recommended to effectively eliminate the colony. Such devices can capture almost whole colonies, without the need to disturb the colony when several change-outs are required.

None of the devices in the above references, save the inventor's prior patent mentioned above, address the changing philosophy of how termites behave and apply that behavior to the temperature anomaly disclosed herein and in the above mentioned patent by the inventor herein.

SUMMARY OF THE INVENTION

The present invention is a device for the control of termites comprising an elongate housing with an inside surface, an outside surface, a lower end, and a closed upper end. The lower end of the elongate housing has an opening for access to an interior of the elongate housing.

The interior of the elongate housing houses a moisture absorbing attractant wherein when the device is placed in a desired location on a ground surface with the lower end of the elongate housing facing, that is resting on, said ground surface, a temperature anomaly detectable by termites is created when at least a portion of the elongate housing is exposed to a natural radiation of the sun so as to heat the moisture absorbing attractant and cause the moisture absorbing attractant to absorb moisture from the ground surface during the day, and as the moisture absorbing attractant cools at night, the moisture absorbing attractant releases the moisture into the ground surface.

More specifically, the thin fluting technology of cardboard, which is the preferred moisture absorbing attractant, affords the highest efficiency heat exchange in the smallest package. The housing shape improves thermal transfer of aquatic properties without the application of additional external moisture enhancement structure. The main problem with regards to the manufacturing of an enhanced thermal surfaced area inside the housing is compatibility to termites with a commercially acceptable price. The thermal dynamics of the invention begin with the formation of unique helical wave forms of the cardboard's convexity. The method of partially implanting increases the surface area over a shorter lineal length. This combination exposed to the thermal radiation of the sun dramatically induces a turbulence and culminates in an enormous increase in overall thermal transfer properties. This invention exhibits superior characteristics in air to air, water to gas, gas to water and finally on the exterior water back to gas.

The transferred state of a water solution to a gaseous state: The concept of the gaseous state offers a simple explanation of properties of water such as diffusion and saturation. As a number of molecules of water in an airborne state increases their freedom to move in all directions, a number of them return or condense to a liquid water phase which correspondingly would be greater in the evening as cooling takes place. Finally a water saturated condition achieves equilibrium. This is achieved when the rates at which the molecules go into and out of solution are equal, only then is the state of balance or equilibrium established. The inventive product achieves this characteristic.

Osmotic Pressure:

The diffusion of water into a gas is resisted by placing fluted permeable cardboard partitions between the liquid and gas volumes. The general nature of this phenomenon may be observed by implanting a so-called permeable membrane, in this case, fluted cardboard and then immerse it in water. The housing of the present invention offers a restriction to the free circulation of water allowing it only to exit from the bottom. The greater passage of water is from the diluted state into the more concentrated solution. When the hydro static pressure becomes significantly great because of the entrance of the new water through the cardboard membrane, the two opposing tendencies are balanced and the passage into or out of the cell temporarily ceases. The hydrostatic pressure is then equal to the osmotic pressure. This fact allows the present invention to remain super saturated while continuing to lose moisture exiting the bottom that is heavily cooler and more condensed then the above being held in place by osmotic pressure. These resources are replaced each and every day from shallow aquifer reserves that are unique to each geographical location. This effect demonstrates the present invention has a superior ability to achieve equilibrium using osmotic pressure against hydro static pressure.

The device further comprises means for anchoring the device to the ground surface, typically an outwardly extending flange along at least a portion of the perimeter of said lower end. The device preferably has a plurality of holes generally evenly spaced apart about a perimeter of the outwardly extending flange for anchoring the device to the ground surface. Although one hole may suffice, at least two and preferably four holes should be provided.

A device using just the moisture absorbing attractant is ideal for monitoring or detecting activity; however, once activity is detected, material should be added to eliminate the colony or a new device already containing material to eliminate the colony should be substituted or placed nearby. Such material may include one of a food source bait, a poison bait, a termitic parasite, a slow acting toxicant and any combination thereof.

Retention means over the opening at the lower end of the elongate housing is recommended for retaining the moisture absorbing attractant within the interior of the elongate housing and for deterring and minimizing human contact to the interior of the elongate housing and the moisture absorbing attractant. This retention means may be a mesh laminate, which preferably has uniform holes ranging in size from ⅛ to ½ inch. Certainly any size mesh would work as long as it serves to retain the moisture absorbing attractant, while still allowing for the ingress and egress of termites from and to the ground to and from the interior of the elongate housing, and still minimizing human contact to the interior of the elongate housing and moisture absorbing attractant.

The mesh laminate may have a perimeter flange portion corresponding to the outwardly extending flange of the elongate housing, wherein the perimeter flange portion has generally evenly spaced apart holes about the perimeter flange, the holes corresponding to the plurality of holes in the outwardly extending flange of the elongate housing.

Means for attachment of the retention means to the elongate housing is suggested. This can be done in a number of ways known in the art, including, snap type connections, friction slip joint connections, tie-wraps through the holes, rivets, etc.

The device may have a typical top-hat type shape or be shaped in a variety of configurations to suit the landscape or obstacles on the ground. For example, the elongate housing may be a circular shape, a semi-circular shape, a polygonal shape, and a combination shape thereof.

Alternatively, the interior portion only may have its surface shaped in a circular shape, a semi-circular shape, a polygonal shape, and a combination shape thereof, with the outside surface of the elongate housing being shaped in any desired shape, including a figurine shape and/or a structure shape.

The elongate housing may be made from transparent material, semi-transparent material, opaque or solid color material, material and/or any combination of such materials. Typically, the material is plastic or polymeric, but may be metallic. Some amount of transparency is preferred to facilitate visual detection and monitoring without the need to disturb the device.

The preferred moisture absorbing attractant is rolled cardboard; although many other materials may be used including wood, combination of wood and cardboard, cow dung pat and other materials as discussed in the present inventors' prior patent disclosed above.

As mentioned to facilitate detection or to facilitate adding a bait to an existing device containing the moisture absorbing attractant only, the closed upper end may include a cover over an open upper end, which is one of detachably engaged and sealingly engaged.

A recessed portion in a ground surface facing side of the moisture absorbing attractant may be included for possible use with other termite control devices. In such a case, the recessed portion is sized to receive a second moisture absorbing attractant, the second moisture absorbing attractant extending from inside the recessed portion a predetermined length beyond the lower end of the elongate housing. In a preferred embodiment, the moisture absorbing attractant in the elongate housing and the second moisture absorbing attractant is rolled cardboard.

Optionally added or already included in the device is one of a food source bait, a poison bait, a termitic parasite, a slow acting toxicant and any combination thereof.

The recessed portion may also be sized to receive a portion of another termite control device for which a remaining portion of the another termite control device is at least partially insertable into the ground.

The other termite control device preferably comprises a longitudinal generally cylindrical-shaped or otherwise elongate housing having an interior, and an upper and lower end; the upper end of the housing including an opening to the interior; the lower end of the housing having at least one opening to the interior for access by termites; and a moisture-absorbing attractant within the interior. The upper end of the generally cylindrical-shaped or elongate housing may have a closed upper end which is typically a cover over the opening to the interior of the generally cylindrical-shaped or elongate housing. This cover is typically detachably engaged or sealingly engaged. This other device may also include one of a food source bait, a poison bait, a termitic parasite, a slow acting toxicant and any combination thereof.

A preferred other device to use in conjunction with the present invention is a device that, when used independently, incorporates the temperature anomaly principle and thermodynamic principles described above. This device is described in the inventors' U.S. Pat. No. 5,899,018 incorporated herein by reference. That is, when the other termite control device is inserted into the ground surface in a desired location without the use of the present invention, the temperature anomaly detectable by termites is created when the upper end of the other termite control device is exposed to the natural radiation of the sun so as to heat the moisture absorbing attractant in said other termite control device and cause the moisture absorbing attractant in said other elongate housing to absorb moisture from the ground surface during the day, and as the moisture absorbing attractant in said generally cylindrical-shaped or elongate housing cools at night, the moisture absorbing attractant in said other elongate housing releases the moisture into the ground surface.

When termite activity is detected in the other termite control device, the present invention is placed on top of the other device such that an upper portion of the other device extending above the ground surface level projects into the recessed portion of the moisture absorbing attractant of the present invention. Of course, the present invention can instead be placed in the proximity of the other device or the other device may be removed and the present invention may be placed over the area where the other device was installed.

Accordingly, the primary object of the present invention is to provide a device and method for termite detection and control which uses thermal radiation of the sun to heat a moisture absorbing attractant such that it absorbs moisture from the soil during the day and releases moisture into the soil at night to create a temperature anomaly that termites can easily detect and the termites will therefore be drawn into the device.

It is a further object of this present invention to provide a device and a method for termite detection and control where the device can be visually inspected to determine if termites are present, and a poison bait may be added without disruption of the termites. It is also a further object of this present invention to provide the device with a greater device capacity in size and shape thereby greatly enhancing the performance of the device in capturing and eliminating termites. This size and shape enhancement being enabled by the temperature anomaly characteristic described above.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE INVENTION

Figure 1:
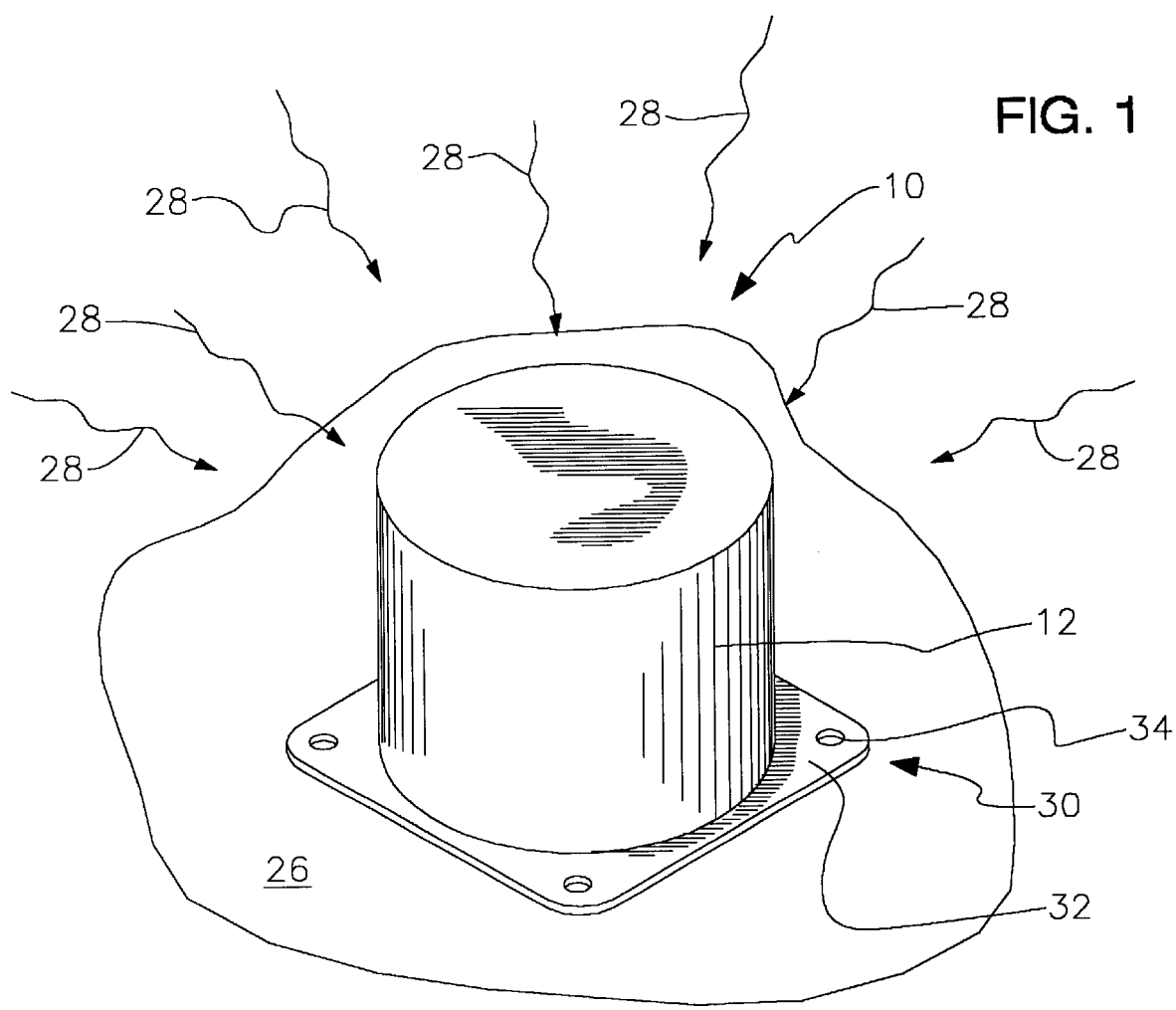
FIG. 1 is a perspective view of the invention on a ground surface.
Figure 2:
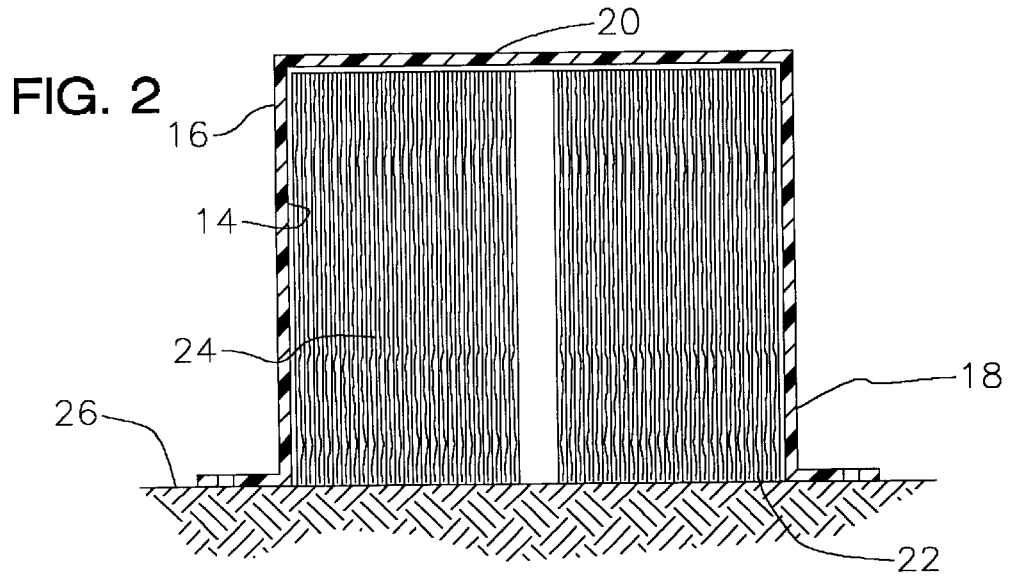
FIG. 2 is a cross-sectional view of the invention.

Referring now to the drawings, in particular FIGS. 1–2, the invention which is a termite control device depicted generally as 10, comprises an elongate housing 12 with an inside surface 14, an outside surface 16, a lower end 18, and a closed upper end 20. The lower end 18 of the elongate housing 12 has an opening 22 for access to an interior of the elongate housing 12; and the interior of the elongate housing 12 contains a moisture absorbing attractant 24.

When the device 10 is placed in a desired location on a ground surface 26 with the lower end 18 of the elongate housing 12 facing said ground surface 26, a temperature anomaly detectable by termites is created when at least a portion of the elongate housing 12 is exposed to a natural radiation 28 of the sun so as to heat the moisture absorbing attractant 24 and cause the moisture absorbing attractant 24 to absorb moisture from the ground surface 26 during the day, and as the moisture absorbing attractant 24 cools at night, the moisture absorbing attractant 24 releases the moisture into the ground surface 26. For obtaining the most effective use of the device 10, it is recommended that the complete housing 12 be exposed to the solar radiation 28. When the attractant 24 releases the moisture into the soil, a temperature anomaly is created as the evaporating water makes a cool "wet spot" which termites can readily detect. Further, the temperature anomaly exaggerates the size of the device 10 to the termites, making the termites believe that device 10 is an excellent food source and thus, more likely that a termite colony will invade the device 10.

More specifically, the thin fluting technology of cardboard, which is the preferred moisture absorbing attractant 24, affords the highest efficiency heat exchange in the smallest package. The housing 12 shape improves thermal transfer of aquatic properties without the application of additional external moisture enhancement structure. The main problem with regards to the manufacturing of an enhanced thermal surfaced area inside the housing is compatibility to termites with a commercially acceptable price. The thermal dynamics of the invention 10 begin with the formation of unique helical wave forms of the cardboard's convexity. The method of partially implanting increases the surface area over a shorter lineal length. This combination exposed to the thermal radiation of the sun dramatically induces a turbulence and culminates in an enormous increase in overall thermal transfer properties. This invention 10 exhibits superior characteristics in air to air, water to gas, gas to water and finally on the exterior water back to gas.

The transferred state of a water solution to a gaseous state: The concept of the gaseous state offers a simple explanation of properties of water such as diffusion and saturation. As a number of molecules of water in an airborne state increases their freedom to move in all directions, a number of them return or condense to a liquid water phase which correspondingly would be greater in the evening as cooling takes place. Finally a water saturated condition achieves equilibrium. This is achieved when the rates at which the molecules go into and out of solution are equal, only then is the state of balance or equilibrium established. The inventive product achieves this characteristic.

Osmotic Pressure:

The diffusion of water into a gas is resisted by placing fluted permeable cardboard partitions between the liquid and gas volumes. The general nature of this phenomenon may be observed by implanting a so-called permeable membrane, in this case, fluted cardboard and then immerse it in water. The housing 12 of the present invention 10 offers a restriction to the free circulation of water allowing it only to exit from the bottom or opening 22 for access to the interior of the housing 12. The greater passage of water is from the diluted state into the more concentrated solution. When the hydro static pressure becomes significantly great because of the entrance of the new water through the cardboard membrane, the two opposing tendencies are balanced and the passage into or out of the cell temporarily ceases. The hydrostatic pressure is then equal to the osmotic pressure. This fact allows the present invention 10 to remain super saturated while continuing to lose moisture exiting the bottom 22 that is heavily cooler and more condensed then the above being held in place by osmotic pressure. These resources are replaced each and every day from shallow aquifer reserves that are unique to each geographical location. This effect demonstrates the present invention 10 has a superior ability to achieve equilibrium using osmotic pressure against hydro static pressure.

Means 30 for anchoring the device 10 to the ground surface 26 is recommended. In a practical application of this feature, the device 10 may include an outwardly extending flange 32 along at least a portion of the perimeter of the lower end 18. This flange 32 typically has a plurality of holes 34 generally evenly spaced apart along the outwardly extending flange 32. Although even one hole would suffice, it is preferable that 2 to 4 holes be used depending on the size of the device 10 being installed.

The device may include one of a food source bait, a poison bait, a termitic parasite, a slow acting toxicant and any combination thereof, depending on the objective of the user or pest control operator. For example, although wood may be considered a moisture absorbing attractant, it is also a better food source and may be combined with the preferred moisture absorbing attractant cardboard, typically rolled cardboard. Rolled cardboard is preferred because the cardboard has an excellent moisture absorption capacity, as well as being a good food source for termites. Furthermore, the cardboard has longitudinal tubes which are visible of the top of the roll. When termites attack the device 10, they travel to the top of the tubes and place dirt and other filler to block the tubes. This activity is easily visible through line of sight when using a transparent upper end 20 of the housing 12 and therefore, makes detection of the termites much easier. Although a poison bait or otherwise slow acting toxicant may be used, a termitic parasite may be utilized when environmental concerns are at issue. Certainly, the use of a relatively large device in such a manner as to take full advantage of the temperature/moisture anomaly created by exposing the device 10 to the radiation of the sun may enable the pest control operator to collect essentially a whole colony without the use of toxicants, at which time the device 10 can be removed for offsite disposal or termination of the colony.

In circumstances where it is preferred to retain or otherwise provide retention means 36 over the opening 22 at the lower end 18 of the elongate housing 12 for retaining the moisture absorbing attractant 24 within the interior of the elongate housing 12 and for deterring and minimizing human contact to the interior of the elongate housing 12 and the moisture absorbing attractant 24, a mesh laminate 38 may be added to the device 10. Typically, the mesh laminate 38 would have uniform holes ranging in size from $\frac{1}{16}$ inch to $\frac{1}{2}$ inch or greater.

Figure 3:
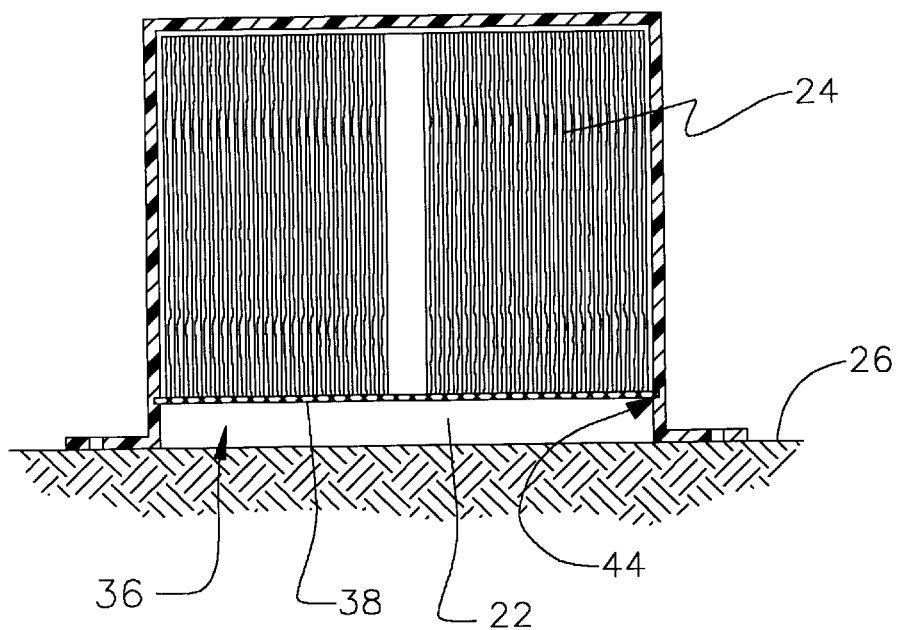
FIG. 3 is a cross-sectional view of the invention with the moisture absorbing attractant being retained with a mesh laminate.
Figure 4:
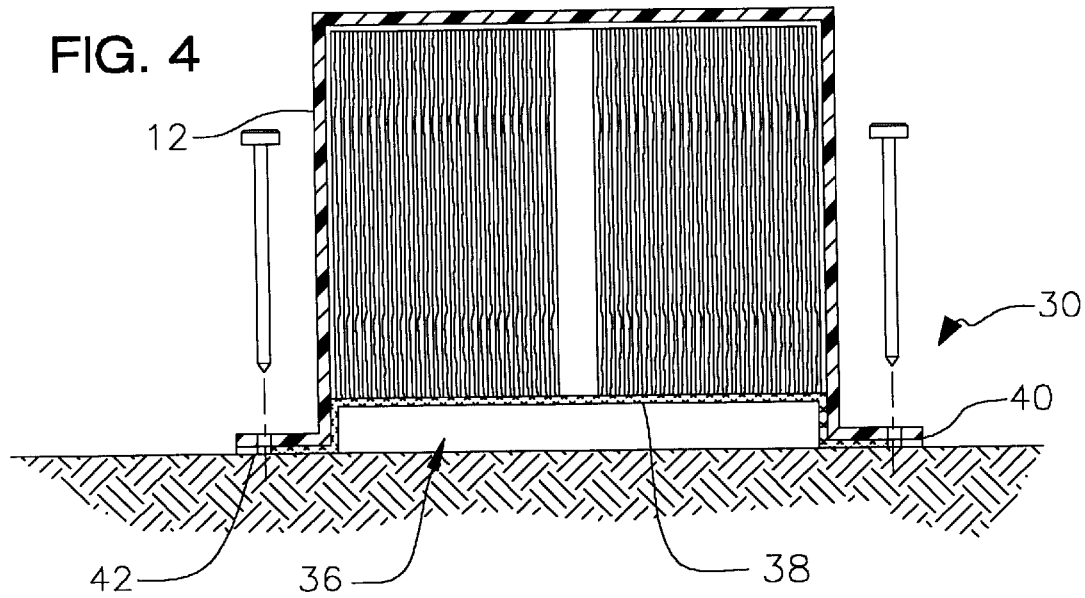
FIG. 4 is a cross-sectional view of the invention with the moisture absorbing attractant recessed within the housing with mesh laminate having a peripheral portion corresponding to the flange portion of the housing for attaching the screen and housing together.

The mesh laminate 38 may be attached inside to engage a holding lip or ridge such as depicted in FIG. 3 or a perimeter flange portion 40, as depicted in FIG. 4, corresponding to the outwardly extending flange 32 of the elongate housing 12 may be used. In the latter situation, the perimeter flange portion 40 has generally evenly spaced apart holes about the perimeter flange 40, the holes corresponding to the plurality of holes 34 in the outwardly extending flange 32 of said elongate housing 12.

Means 44 for attachment of the retention means to the elongate housing may include the lip or ridge type connection described above or may include a tie connector, a rivet connector, or a snap-type connector through corresponding aligned holes 34,42.

Figure 10:
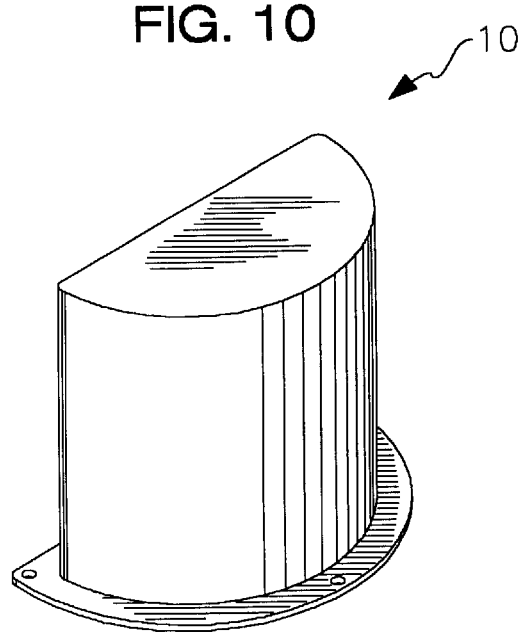
FIG. 10 is a perspective view depicting one example of a typical housing shape, namely semi-circular.
Figure 11:
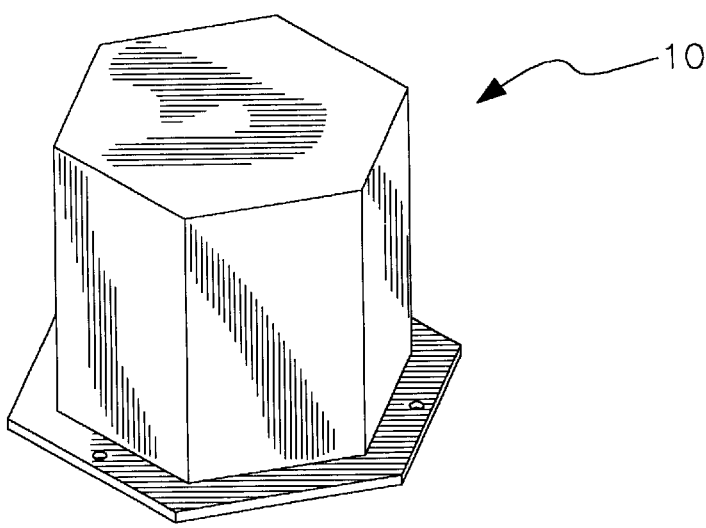
FIG. 11 is a perspective view depicting another example of a typical housing shape, namely multi-sided or polygonal.
Figure 12:
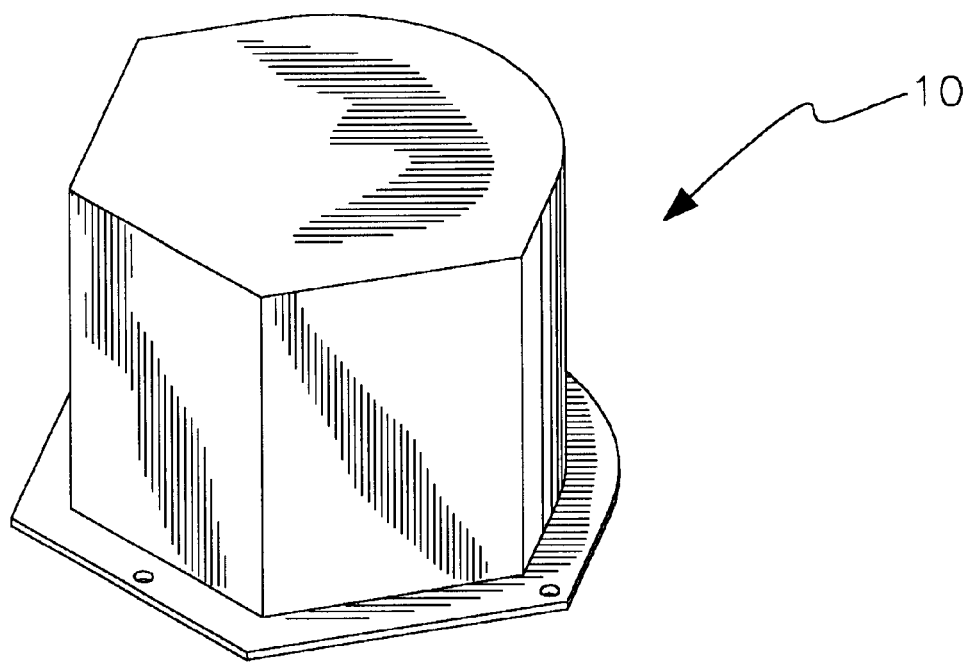
FIG. 12 is a perspective view depicting another example of a typical housing shape, namely a combination of arcuate or partially circular and multi-sided or polygonal.

The device 10 may be made from any polymeric or metallic material and may be shaped in any desired configuration to suit an installation and obstacles thereabouts. For example, the device 10 may have its elongate housing 12 shaped in a circular shape, a semi-circular shape, a polygonal shape, and/or a combination shape thereof, as depicted in FIGS. 10–12.

Figure 13:
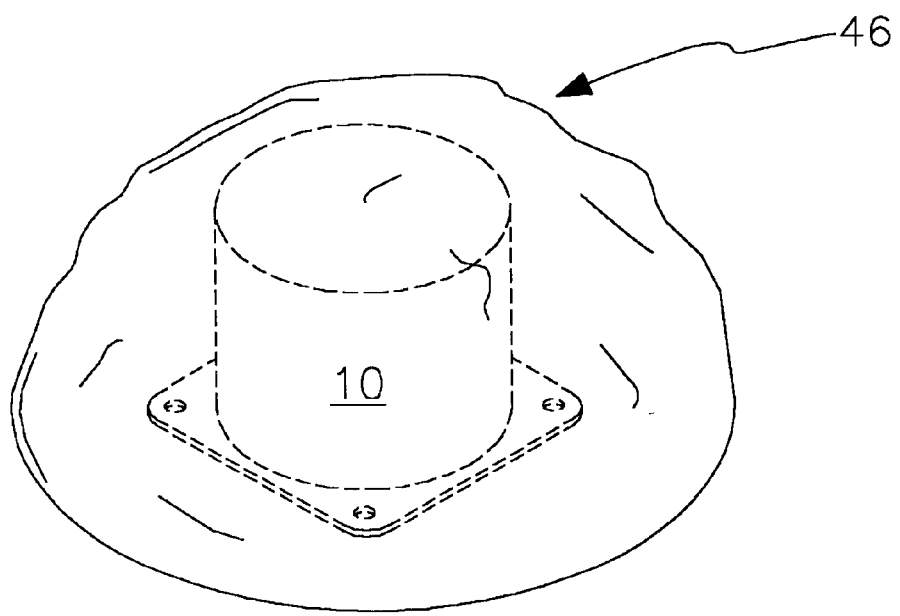
FIG. 13 is a view of one application of the invention hidden or aesthetically covered by a decorative shape of desired theme.

In fact, the outside surface 16 itself of the device 10 may be shaped in any desired shape, including a figurine shape and a structure shape. This would be useful in places such as the front of homes or businesses where the device 10 is located on lawns or in a planted bush/flower area where the homeowner or business owner does not want to bring attention to the fact that termite control devices are being used. Similarly, the devices may be used in theme parks in areas where attendees walk by and observe. Either the outside surface itself can be designed to include an integral shape such as a figurine, for example, an animal, or a structure shape, for example, a planter, bridge, rock, etc.; or the device 10 may be used inside a super imposed structure or superstructure 46 as depicted in FIG. 13.

The material used for the elongate housing 12 may be transparent or semi-transparent if the operator is interested in monitoring activity without having to lift the device 10, or it may be opaque or made from a solid color material. Of course, the housing 12 may incorporate transparency on a portion of the device such as at the upper end 20 with the remaining portion non-transparent, opaque or solid or any combination thereof. Transparency is advantageous, as it allows inspections of the attractant 24 to see if the termites are present, without disturbing the device 10. Termites are known to leave an area when the soil is disturbed, and leave a pheromonal warning signal for other termites to avoid the area. Thus, in most prior art devices, the device or a cartridge thereof had to be removed to be inspected for termite activity or a monitoring station was used and if activity was observed, then a bait station was placed close by. The disturbance causes the termites to send a signal to the colony to leave the area, and thus, leave the device. When a poison bait is inserted into the device, through cartridges, the termites have already fled and the effectiveness in controlling the termites is greatly lessened.

The present inventive device 10 does not suffer this problem, as it can be determined through simple visual inspection that termites are present. Then, if poison bait is needed, entire contents of the initial device including termites are physically remove, replacing with a new child resistant device with poisoned attractant included. Consequently, the termites will not the flee the device 10 and any poison bait inserted will have its full effectiveness in controlling termites. Although, the poison bait may be contained within or inserted contemporaneously with the attractant 24 such that a separate step of insertion is not necessary.

When device 10 is used without a poison bait, that is, as a monitoring or termite collecting station, the removable top is advantageous for inspecting the device 10 or for adding poison; however, it would be preferred as mentioned above to simply remove the device 10 with the termites inside and to instead replace the device with a larger device or one containing a poison to kill off the colony.

As mentioned above, the preferred moisture absorbing attractant 24 is rolled cardboard, although cow dung may be useful as well or in combination with the rolled cardboard. Cow dung makes an excellent attractant as it is a preferred food source for termites. The use of cow dung captures nitrogen rich moisture from the soil, and fosters natural occurring microbes, fungal spores and beneficial nest mates of termites. As previously mentioned, pine wood may also be wrapped within the cardboard to provide additional food for termites to forage when the cardboard is completely consumed.

Figure 8:
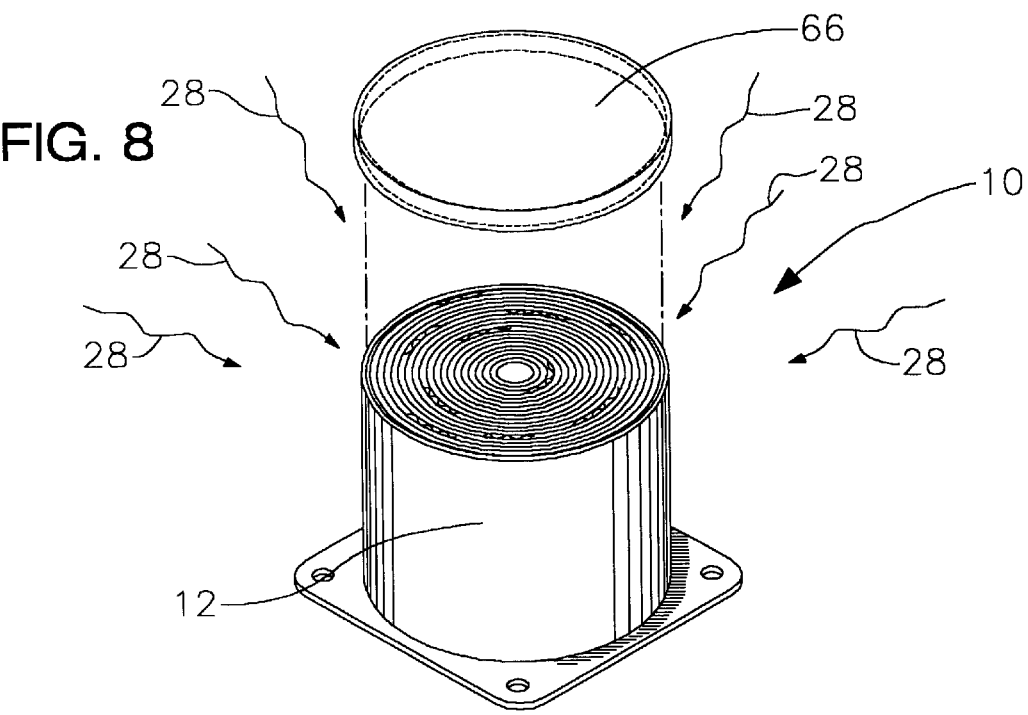
FIG. 8 is a perspective view of the invention incorporating a cover portion.

In an alternative embodiment, device 10 is modified such that the closed upper end 20 includes a cover 66 over an open upper end 20, as depicted in FIG. 8. This cover 66 may be detachably engaged so an operator can remove it to add material such as bait poison, wood, substitute or add rolled cardboard, cow dung, termitic parasites, etc. In situations, where it is preferable to make the cover somewhat tamper proof or at least more difficult to open, the cover may be frictionally engaged such that a reasonable amount additional effort is required to open the cover, possibly with the help of a screw driver to pry to cover 66 open. Alternatively, if the device has any toxicant already in the device, the cover 66 may be sealed in place to prevent tampering at least from the upper end 20 of the housing 12.

Figure 5:
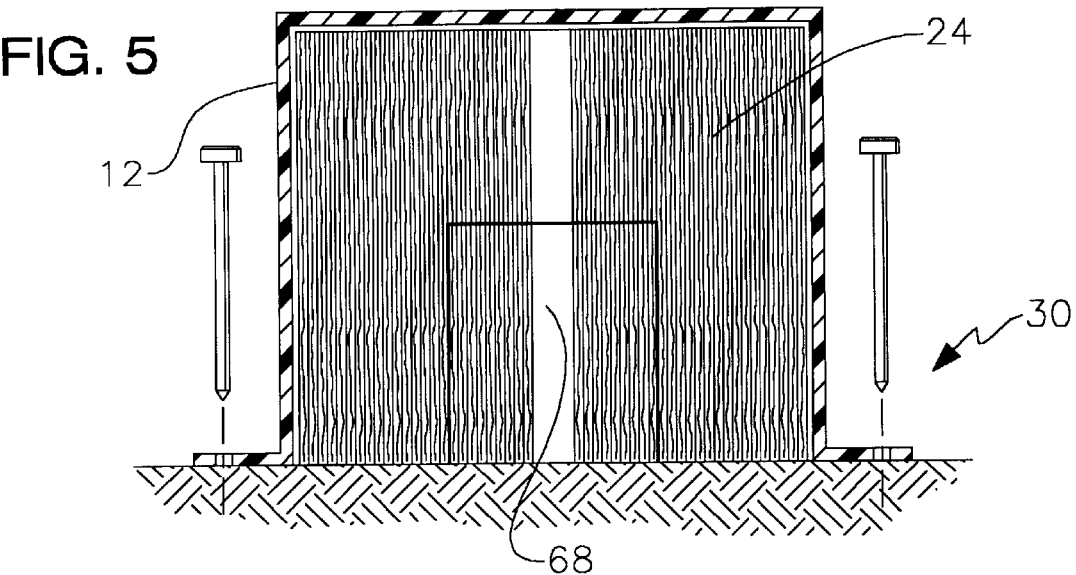
FIG. 5 is a cross-sectional view of the invention depicting a hollow recessed portion within the moisture absorbing attractant.
Figure 6:
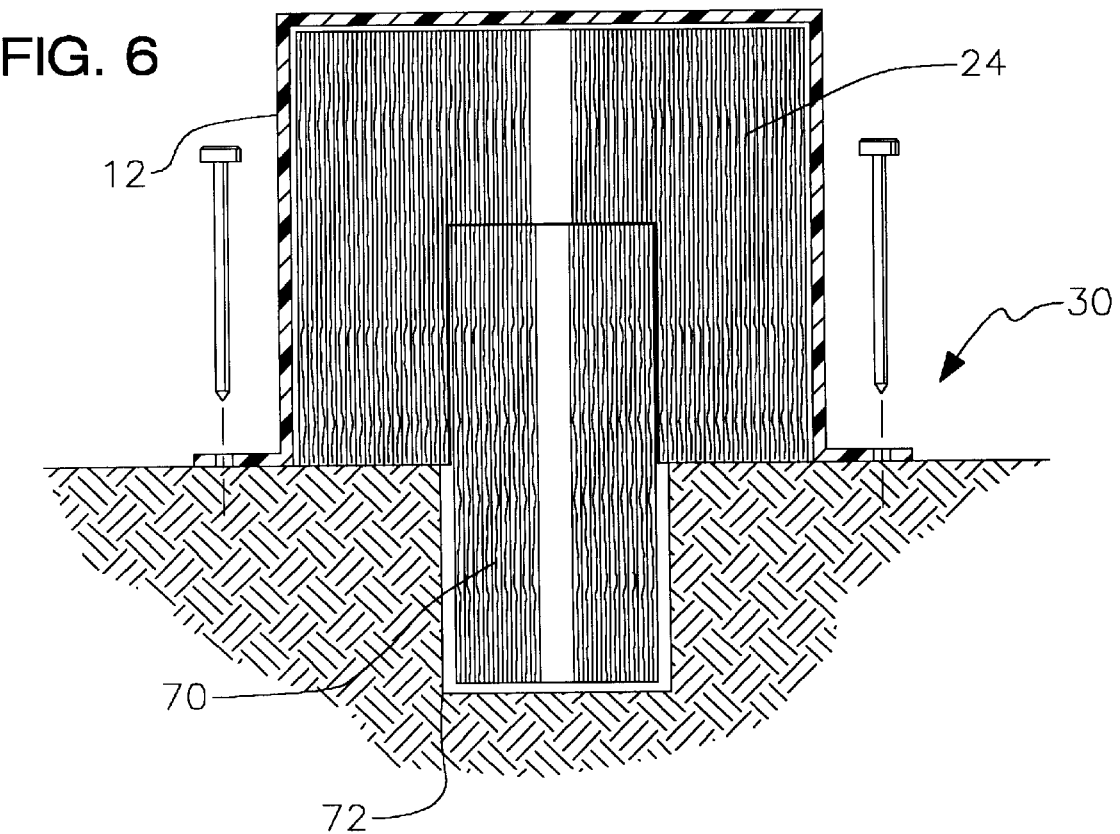
FIG. 6 is a cross-sectional view of the invention depicting the recessed portion of FIG. 5 with an extended moisture absorbing attractant inserted therein and extending into a hole in the ground surface.
Figure 7:
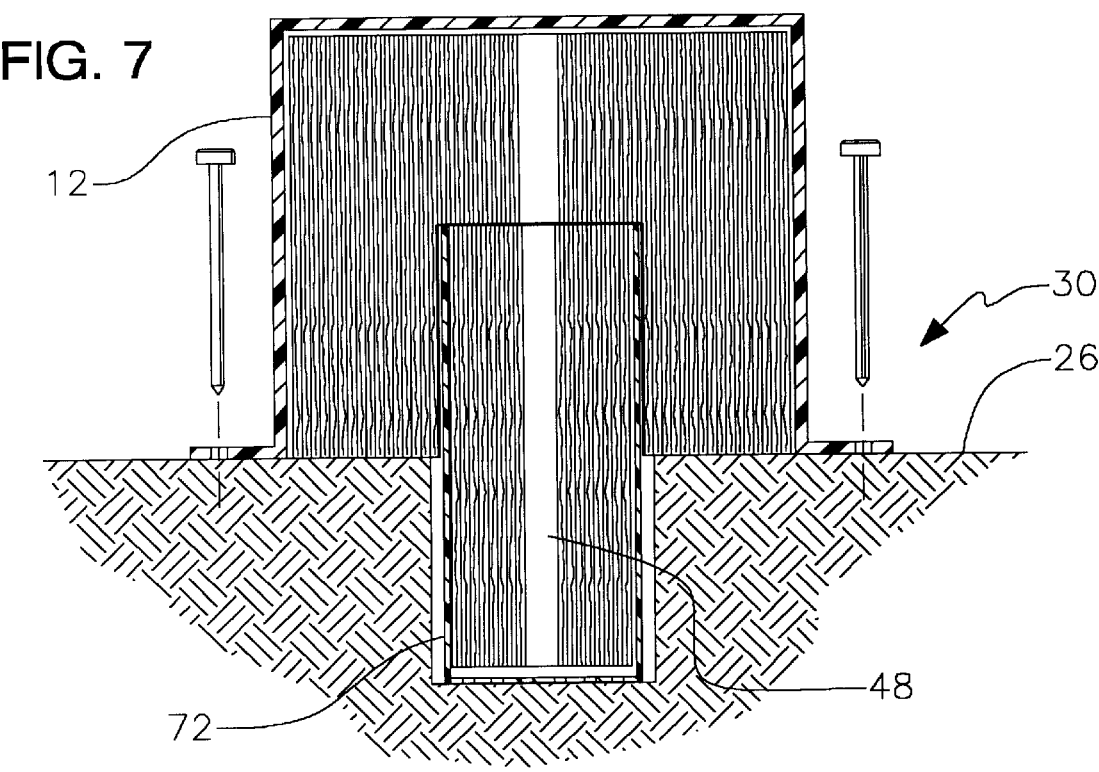
FIG. 7 is a cross-sectional view of the invention depicting the recessed portion of FIG. 5 with a bait station or insect control device inserted therein and extending into a hole in the ground surface.

A recessed portion 68 in a ground surface facing side of the moisture absorbing attractant 24 may be incorporated in the device 10. This feature will enable the incorporation of an extension of the moisture absorbing attractant 24 into and below the ground surface 26 by adding a second moisture absorbing attractant 70 or even another termite control device 48 wherein the second moisture absorbing attractant 70 or the other termite control device 48 extend from inside the recessed portion 68 a predetermined length beyond the lower end 18 of the elongate housing 12 into a pre-dug hole 72 in the ground surface 26 as depicted in FIGS. 5–7.

It is preferable that the moisture absorbing attractant 24 in the elongate housing 12 and the second moisture absorbing attractant 70 both be rolled cardboard.

As with the moisture absorbing attractant 24 in the housing 12, the second moisture absorbing attractant 70 may also include one of a food source bait, a poison bait, a termitic parasite, a slow acting toxicant and any combination thereof.

The poisoned bait should be a slow acting toxicant such that the termites will take the toxicant back to the other members of the colony for consumption, thus causing an effective destruction of the entire colony. Examples of poisons which are useful in the present invention include organic compounds such as, fluoroaliphatic sulfonamides such as sulfluramid and their related sulfonic acid analogues, amidinohydrazones such as hydramethylnon, advermectin, silafluofen, glycol borate esters, and dihaloalkyl sulfones. These toxicants should be used in relatively small amounts, at the most 0.01% to 0.5% by weight, because any higher amount of toxicant may repel termites. Alternatively, insect growth regulators, termitic pathogens, termitic parasites, or metabolic inhibitors could be used for the poison bait.

As mentioned above, the device 10 may be modified such that the recessed portion 68 is sized to receive a portion of another termite control device 48 for which a remaining portion of the another termite control device 48 is at least partially insertable into the ground 26.

Figure 9:
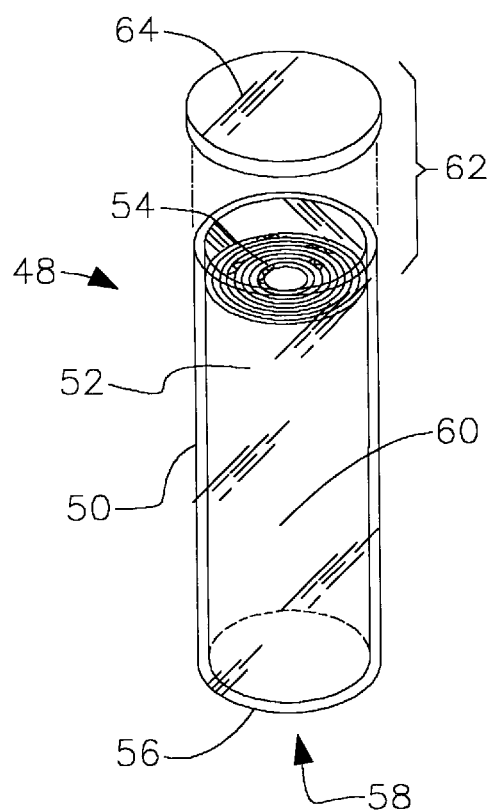
FIG. 9 is an elevation view of a termite bait station typically used with the invention as depicted in FIG. 7.

Any other termite control device may be used for the invention incorporating recessed portion 68. For example, the Gordon Laboratories, Inc. device which is disclosed in U.S. Pat. No. 5,899,018 by the inventors herein, which is incorporated herein by reference. This device may be used with or without the cover provision disclosed in the above patent. For example, the another termite control device 48 as contemplated by this disclosure and depicted in FIG. 9, typically comprises a longitudinal elongate housing 50 having an interior 52, and an upper and lower end, 54 and 56 respectively. The upper end 54 of the housing 50 includes an opening to the interior 52 and the lower end 56 of the housing 50 has at least one opening 58 to the interior 52 for access by termites. A moisture-absorbing attractant 60 disposed within the interior 52. As described in the above patent, the upper end 54 of the another termite control device 48 may include a closed upper end 54 by incorporating with the device 48 a cover 64 over the opening to the interior 52 of the other termite control device 48. This cover may be sealed or frictionally engaged such that it takes a reasonable amount of deliberate effort to remove or detach the cover 64. When used with the present invention 10, it is preferred that the other termite control device 48 not include a cover 64. This other termite control device 48 may typically include one of a food source bait, a poison bait, a termitic parasite, a slow acting toxicant and any combination thereof.

As is contemplated by the inventor herein, the present invention 10 may be constructed such that its interior diametric or diagonal cross-sectional dimension may range from as little as 4 inches across to several inches across, for example, 36–60 inches across. A typical height may range from 4 inches to 12 inches, although greater heights are contemplated.

The recommended method of use of the present device 10 to detect and control termites particularly around a building, is to place devices 10 between 2–3 feet from the foundation of a building. The devices 10 should also be placed no greater than 20 feet apart from each other. By such placement, the devices 10 should attract any foraging subterranean termite prior to the entry into the foundation of a building or attract termites already within the building 38.

Once termites are seen in the interior of the housing 12, a new housing containing poison bait, if not already present, may replace the infested housing 12, and the termites, undisturbed, should then transport the poison to the entire colony such that entire colony is destroyed. This method controls termites reaching the building as well as termites already within the building 38 as the attractant 24 is particularly alluring to foraging termites, that is, termites may stray from the building in favor of the attractant 24.

Two or three devices 10 may also be concentrated in an area particularly conducive for termite infestations, such as excessive moisture sources near foundations, wooden mulched flower beds, dead tree stump, and other wood to ground contact areas like fence posts.

As seen from the foregoing description, the present invention satisfies a long felt need to provide a device which is effective and efficient in termite control because it takes advantage of the true social behavior of termites. Developing an essentially above ground device and/or essentially above ground and partially extending into the ground by using either another termite device inserted into the recessed portion or another moisture absorbing attractant, as depicted in FIGS. 6 and 7, a device which is designed to take advantage of a more accurate determination of the social behavioral characteristics of termites, colony elimination can be much more effective and efficient than heretofore known.

The invention is clearly new and useful. Moreover, it was not obvious to those of ordinary skill in this art at the time it was made, in view of the prior art considered as a whole as required by law.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in the limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A device for the trapping and elimination of a termite colony comprising:

an elongate housing with an inside surface, an outside surface, a lower end, and a closed upper end;

the lower end of the elongate housing having an opening for access to an interior of the elongate housing; and the interior of the elongate housing having an edible moisture absorbing attractant, at least a portion of which extends generally from the upper end to the lower end proximate the opening for access to the interior of the elongate housing;

the device having means for anchoring said device in a desired location on top of a ground surface with the lower end of the elongate housing facing said ground surface, wherein placing said device on top of the ground surface does not disturb the termite colony; and the device having a predetermined dimension greater than 4 inches at its narrowest diagonal cross-section and 6 inches or greater in height and an overall volumetric size so as to be capable of capturing, for the subsequent removal thereof, a majority of the colony of termites, wherein when the device is placed in the desired location on top of the ground surface with the lower end of the elongate housing facing said ground surface, a temperature anomaly detectable by termites is created when at least a portion of the elongate housing is exposed to a natural radiation of the sun so as to heat the moisture absorbing attractant and cause the moisture absorbing attractant to absorb moisture from the ground surface during the day, and as the moisture absorbing attractant cools at night, the moisture absorbing attractant releases the moisture into the ground surface.

2. The device according to claim 1, wherein the means of anchoring to the ground surface is an outwardly extending flange along at least a portion of a perimeter of said lower end.

3. The device according to claim 2, further having a plurality of holes generally evenly spaced apart in the outwardly extending flange.

4. The device according to claim 3, wherein the plurality of holes is at least 2.

5. The device according to claim 3, wherein the plurality of holes is at least 4.

6. The device according to claim 1, further comprising one of a food source bait, a poison bait, a termitic parasite, a slow acting toxicant and any combination thereof.

7. The device according to claim 1, further comprising retention means over the opening at the lower end of the elongate housing for retaining said moisture absorbing attractant within said interior of the elongate housing and for deterring and minimizing human contact to the interior of the elongate housing and the moisture absorbing attractant.

8. The device according to claim 7, wherein the retention means is a mesh laminate.

9. The device according to claim 8, wherein said mesh laminate has uniform holes ranging in size from ⅛ to ½ inch.

10. The device according to claim 3, further comprising retention means over the opening at the lower end of the elongate housing for retaining said moisture absorbing attractant within said interior of the elongate housing and for deterring and minimizing human contact to the interior of the elongate housing and the moisture absorbing attractant.

11. The device according to claim 10, wherein the retention means is a mesh laminate.

12. The device according to claim 11, wherein said mesh laminate has uniform holes ranging in size from ⅛ to ½ inch, and wherein said mesh laminate has a perimeter flange portion corresponding to the outwardly extending flange of the elongate housing, and wherein the perimeter flange portion has generally evenly spaced apart holes about the perimeter flange, said holes corresponding to the plurality of holes in the outwardly extending flange of said elongate housing.

13. The device according to claim 7, further comprising means for attachment of the retention means to the elongate housing.

14. The device according to claim 12, further comprising means for attachment of the retention means to the elongate housing.

15. The device according to claim 1, wherein said elongate housing has one of a circular shape, a semi-circular shape, a polygonal shape, and a combination shape thereof.

16. The device according to claim 1, wherein said inside surface of the elongate housing has one of a circular shape, a semi-circular shape, a polygonal shape, and a combination shape thereof, and wherein the outside surface of said elongate housing is shaped in any desired shape, including a figurine shape and a structure shape.

17. The device according to claim 1, wherein said elongate housing is one of transparent, semi-transparent, opaque, solid color and any combination thereof.

18. The device according to claim 1, wherein the moisture absorbing attractant is rolled cardboard.

19. The device according to claim 1, wherein the moisture absorbing attractant is cow dung.

20. The device according to claim 1, wherein the closed upper end comprises:
 a cover over an open upper end.

21. The device according to claim 20, wherein the cover is one of detachably engaged and sealingly engaged.

22. The device according to claim 1, further comprising:
 a recessed portion in a ground surface facing side of the moisture absorbing attractant.

23. The device according to claim 22, wherein the recessed portion is sized to receive a second pre-installed moisture absorbing attractant, the second moisture absorbing attractant extending from inside the recessed portion a predetermined length beyond the lower end of the elongate housing.

24. The device according to claim 23, wherein the moisture absorbing attractant in the elongate housing and the second moisture absorbing attractant is rolled cardboard.

25. The device according to claim 24, further comprising one of a food source bait, a poison bait, a termitic parasite, a slow acting toxicant and any combination thereof.

26. The device according to claim 22, wherein the recessed portion is sized to receive a portion of a pre-installed in the ground termite control device for which a remaining portion of the pre-installed in the ground termite control device is at least partially insertable into the ground.

27. The device according to claim 26, wherein the pre-installed in the ground termite control device comprises:
 a longitudinal elongate housing having an interior, and an upper and lower end;
 the upper end of the housing including an opening to the interior;
 the lower end of the housing having at least one opening to the interior for access by termites; and
 a moisture-absorbing attractant within the interior.

28. The device according to claim 27, wherein the upper end of the pre-installed in the ground termite control device is a closed upper end.

29. The device according to claim 28, wherein the closed upper end comprises a cover over the opening to the interior of the pre-installed in the ground termite control devise.

30. The device according to claim 29, wherein the cover over the opening to the interior of the pre-installed in the ground termite control device is one of detachably engaged and sealingly engaged.

31. The device according to claim 27, wherein the pre-installed in the ground termite control device further comprises one of a food source bait, a poison bait, a termitic parasite, a slow acting toxicant and any combination thereof.

32. The device according to claim 1, wherein the device is placed in a desired location and covered so as to hide and otherwise camouflage the device with a superstructure comprising any desired shape, including a figuring shape and a structure shape.

33. A method for trapping and eliminating a termite colony comprising the steps of:
 providing a termite colony elimination apparatus for trapping and subsequently removing the colony of termites, the termite colony elimination apparatus comprising:
  edible moisture absorbing attractant means in an interior of said termite colony elimination apparatus;
  access means at a bottom end of said termite colony elimination apparatus for termites to enter termite control apparatus for access to the edible moisture absorbing attractant, at least a portion of the edible moisture absorbing attractant extending generally from an upper end to proximate the bottom end of the termite colony elimination apparatus;
 means for anchoring the termite colony elimination apparatus to the top of the ground surface, the means being an outwardly extending flange along a portion of a perimeter of said bottom end, wherein placing said termite colony elimination apparatus on the top of the ground surface does not disturb the termite colony;
  the termite colony elimination apparatus having a pre-determined dimension greater than 4 inches at its narrowest diagonal cross-section and 6 inches or greater in height and an overall volumetric size so as to be capable of capturing, for the subsequent removal thereof, a majority of the colony of termites; and
 using the termite colony elimination apparatus so as to create a temperature anomaly detectable by termites by placing said bottom end of said termite colony elimination apparatus on top of a ground surface with the access means facing said ground surface at a location such that at least a portion of the termite colony elimination apparatus is exposed to a natural radiation of the sun,
 wherein the temperature anomaly detectable by termites is created when heat generated in the apparatus caused by its exposure to the natural radiation of the sun heats the moisture absorbing attractant during the day, and the moisture absorbing attractant cools at night.

34. The method according to claim 33, wherein the termite colony elimination apparatus comprises:
 a housing with an outside surface, the bottom end with its access means, and a closed upper end.

35. The method according to claim 33, further comprising the step of:
 providing a plurality of holes generally evenly spaced apart in the outwardly extending flange.

36. The method according to claim 35, wherein the plurality of holes is at least 2.

37. The method according to claim 35, wherein the plurality of holes is at least 4.

38. The method according to claim 33, further comprising the step of:
 providing one of a food source bait, a poison bait, a termitic parasite, a slow acting toxicant and any combination thereof for terminating said termites.

39. The method according to claim 33, further comprising the step of:
 providing retention means over the access means at the bottom end of the termite colony elimination apparatus for retaining said moisture absorbing attractant within said termite colony elimination apparatus and for deterring and minimizing human contact to the interior of the termite colony elimination apparatus and the moisture absorbing attractant.

40. The method according to claim 39, wherein the retention means is a mesh laminate.

41. The method according to claim 40,
 wherein said mesh laminate has uniform holes ranging in size from ⅛ to ½ inch.

42. The method according to claim 35, further comprising the step of:
   providing retention means over the opening at the bottom end of the termite colony elimination apparatus for retaining said moisture absorbing attractant within said interior of the termite colony elimination apparatus and for deterring and minimizing human contact to the interior of the termite colony elimination apparatus and the moisture absorbing attractant.

43. The method of claim 42, wherein the retention means is a mesh laminate.

44. The method according to claim 43,
   wherein said mesh laminate has uniform holes ranging in size from 1/8 to 1/2 inch, and
   wherein said mesh laminate has a perimeter flange portion corresponding to the outwardly extending flange of the termite colony elimination apparatus lower end, and
   wherein the perimeter flange portion has generally evenly spaced apart holes about the perimeter flange, said holes corresponding to the plurality of holes in the outwardly extending flange of said termite colony elimination apparatus.

45. The method according to claim 39, further comprising the step of:
   providing means for attachment of the retention means to the elongate housing.

46. The method according to claim 44, further comprising the step of:
   providing means for attachment of the retention means to the elongate housing.

47. The method according to claim 34, wherein said termite colony elimination apparatus has one of a circular shape, a semi-circular shape, a polygonal shape, and a combination shape thereof.

48. The method according to claim 34,
   wherein said interior of the termite colony elimination apparatus has a surface which is one of a circular shape, a semi-circular shape, a polygonal shape, and a combination shape thereof, and
   wherein the outside surface of said elongate housing is shaped in any desired shape, including a figurine shape and a structure shape.

49. The method according to claim 33, wherein said termite colony elimination apparatus is one of transparent, semi-transparent, opaque, solid color and any combination thereof.

50. The method of claim 33, wherein the moisture absorbing attractant is rolled cardboard.

51. The method according to claim 33, wherein the moisture absorbing attractant is cow dung.

52. The method according to claim 34, wherein the closed upper end comprises:
   a cover over an open upper end.

53. The method according to claim 52, wherein the cover is one of detachably engaged and sealingly engaged.

54. The method according to claim 33, further comprising the step of:
   providing a recessed portion in a ground surface facing side of the moisture absorbing attractant.

55. The method according to claim 54, wherein the recessed portion is sized to receive a pre-installed second moisture absorbing attractant, the pre-installed second moisture absorbing attractant extending from inside the recessed portion a predetermined length beyond the bottom end of the termite colony elimination apparatus.

56. The method according to claim 55, wherein the moisture absorbing attractant in the elongate housing and the second moisture absorbing attractant is rolled cardboard.

57. The method according to claim 56, further comprising the step of:
   providing one of a food source bait, a poison bait, a termitic parasite, a slow acting toxicant and any combination thereof.

58. The method according to claim 54,
   wherein the recessed portion is sized to receive a portion of a pre-installed in the ground termite control apparatus for which a remaining portion of the pre-installed in the ground termite control apparatus is at least partially insertable into the ground.

59. The method according to claim 58, wherein the pre-installed in the ground termite control apparatus comprises:
   a longitudinal elongate housing having an interior, and an upper and lower end;
   the upper end of the housing including an opening to the interior;
   the lower end of the housing having at least one opening to the interior for access by termites; and
   a moisture-absorbing attractant within the interior.

60. The method according to claim 59, wherein the upper end of the pre-installed in the ground termite control apparatus is a closed upper end.

61. The method according to claim 60, wherein the closed upper end comprises a cover over the opening to the interior of the pre-installed in the ground termite control apparatus.

62. The method according to claim 61, wherein the cover over the opening to the interior of the pre-installed in the ground termite control apparatus is one of detachably engaged and sealingly engaged.

63. The method according to claim 59, wherein the pre-installed in the ground termite control apparatus further comprises one of a food source bait, a poison bait, a termitic parasite, a slow acting toxicant and any combination thereof.

64. The method according to claim 33, further comprising the step of:
   placing the termite colony elimination apparatus in a desired location and covering said termite colony elimination apparatus so as to hide and otherwise camouflage the termite colony elimination apparatus with a superstructure comprising any desired shape, including a figuring shape and a structure shape.

65. A method for trapping and eliminating a termite colony comprising the steps of:
   providing an apparatus for trapping and subsequently removing the colony of termites, the apparatus comprising:
      edible moisture absorbing attractant means in an interior of said apparatus;
      access means at a bottom end of said apparatus for termites to enter the apparatus for access to the edible moisture absorbing attractant, at least a portion of the edible moisture absorbing attractant extending generally from an upper end to proximate the bottom end of the apparatus;
      the apparatus having a predetermined dimension greater than 4 inches at its narrowest diagonal cross-section and 6 inches or greater in height and an overall volumteric size so as to be capable of capturing, for the subsequent removal thereof, a majority of the colony of termites; and means for anchoring the apparatus to the top of the ground surface, the means being an outwardly extending flange along a portion of a perimeter of said bottom end, wherein placing said apparatus on top of the ground surface does not disturb the termite colony, and wherein said bottom end of said apparatus is intended to be placed on top of a ground surface with the access means facing said ground surface at a location such that at least a portion of the apparatus is exposed to a natural radiation of the sun such that a temperature anomaly detectable by termites is created when heat generated in the apparatus caused by its exposure to the natural radiation of the sun heats the moisture absorbing attractant during the day, and the moisture absorbing attractant cools at night.

66. The method according to claim 65, wherein the apparatus comprises:

a housing with an outside surface, the bottom end with its access means, and a closed upper end.

67. The method according to claim 65, further comprising the step of:

providing a plurality of holes generally evenly spaced apart in the outwardly extending flange.

68. The method according to claim 67, wherein the plurality of holes is at least 2.

69. The method according to claim 67, wherein the plurality of holes is at least 4.

70. The method according to claim 65, further comprising the step of:

providing one of a food source bait, a poison bait, a termitic parasite, a slow acting toxicant and any combination thereof for terminating said termites.

71. The method according to claim 65, further comprising the step of:

providing retention means over the access means at the bottom end of the apparatus for retaining said moisture absorbing attractant within said apparatus and for deterring and minimizing human contact to the interior of the apparatus and the moisture absorbing attractant.

72. The method according to claim 71, wherein the retention means is a mesh laminate.

73. The method according to claim 72, wherein said mesh laminate has uniform holes ranging in size from ⅛ to ½ inch.

74. The device according to claim 67, further comprising the step of:

providing retention means over the opening at the bottom end of the apparatus for retaining said moisture absorbing attractant within said interior of the apparatus and for deterring and minimizing human contact to the interior of the apparatus and the moisture absorbing attractant.

75. The method according to claim 74, wherein the retention means is a mesh laminate.

76. The method according to claim 75, wherein said mesh laminate has uniform holes ranging in size from ⅛ to ½ inch, and wherein said mesh laminate has a perimeter flange portion corresponding to the outwardly extending flange of the apparatus lower end, and wherein the perimeter flange portion has generally evenly spaced apart holes about the perimeter flange, said holes corresponding to the plurality of holes in the outwardly extending flange of said apparatus.

77. The method according to claim 71, further comprising the step of:

providing means for attachment of the retention means to the elongate housing.

78. The method according to claim 76, further comprising the step of:

providing means for attachment of the retention means to the elongate housing.

79. The method according to claim 66, wherein said apparatus has one of a circular shape, a semi-circular shape, a polygonal shape, and a combination shape thereof.

80. The method according to claim 66, wherein said interior of the apparatus has a surface which is one of a circular shape, a semi-circular shape, a polygonal shape, and a combination shape thereof, and wherein the outside surface of said elongate housing is shaped in any desired shape, including a figurine shape and a structure shape.

81. The method according to claim 65, wherein said apparatus is one of transparent, semi-transparent, opaque, solid color and any combination thereof.

82. The method according to claim 65, wherein the moisture absorbing attractant is rolled cardboard.

83. The method according to claim 65, wherein the moisture absorbing attractant is cow dung.

84. The method according to claim 66, wherein the closed upper end comprises:

a cover over an open upper end.

85. The method according to claim 84, wherein the cover is one of detachably engaged and sealingly engaged.

86. The method according to claim 65, further comprising the step of:

providing a recessed portion in a ground surface facing side of the moisture absorbing attractant.

87. The method according to claim 86, wherein the recessed portion is sized to receive a pre-installed second moisture absorbing attractant, the pre-installed second moisture absorbing attractant extending from inside the recessed portion a predetermined length beyond the bottom end of the apparatus.

88. The method according to claim 87, wherein the moisture absorbing attractant in the elongate housing and the second moisture absorbing attractant is rolled cardboard.

89. The method according to claim 88, further comprising the step of:

providing one of a food source bait, a poison bait, a termitic parasite, a slow acting toxicant and any combination thereof.

90. The method according to claim 87, wherein the recessed portion is sized to receive a portion of a pre-installed in the ground termite control apparatus for which a remaining portion of the pre-installed in the ground termite control apparatus is at least partially insertable into the ground.

91. The method according to claim 90, wherein the pre-installed in the ground termite control apparatus comprises:

a longitudinal elongate housing having an interior, and an upper and lower end;

the upper end of the housing including an opening to the interior;

the lower end of the housing having at least one opening to the interior for access by termites; and a moisture-absorbing attractant within the interior.

92. The method according to claim 91, the upper end of the pre-installed in the ground termite control apparatus is a closed upper end.

93. The method according to claim 92, wherein the closed upper end comprises a cover over the opening to the interior of the pre-installed in the ground termite control apparatus.

94. The method according to claim 93, wherein the cover over the opening to the interior of the pre-installed in the ground termite control apparatus is one of detachably engaged and sealingly engaged.

95. The method according to claim 91, wherein the pre-installed in the ground termite control apparatus further comprises one of a food source bait, a poison bait, a termitic parasite, a slow acting toxicant and any combination thereof.

96. The method according to claim 65, further comprising the step of:

placing the apparatus in a desired location and covering said apparatus so as to hide and otherwise camouflage the apparatus with a superstructure comprising any desired shape, including a figuring shape and a structure shape.

* * * * *